United States Patent
Seligmann

(10) Patent No.: US 7,046,784 B2
(45) Date of Patent: May 16, 2006

(54) POLITE CALL WAITING NOTIFICATION

(75) Inventor: Doree Duncan Seligmann, New York, NY (US)

(73) Assignee: Avaya Technology Corp., Basking Ridge, NJ (US)

( * ) Notice: Subject to any disclaimer, the term of this patent is extended or adjusted under 35 U.S.C. 154(b) by 48 days.

(21) Appl. No.: 10/186,859

(22) Filed: Jul. 1, 2002

(65) Prior Publication Data
US 2004/0001584 A1 Jan. 1, 2004

Related U.S. Application Data

(60) Provisional application No. 60/380,140, filed on May 6, 2002.

(51) Int. Cl.
*H04M 3/42* (2006.01)
(52) U.S. Cl. ................................. 379/215.01
(58) Field of Classification Search ........... 379/215.01, 379/211.01, 211.02, 210.02, 207.02, 201.11
See application file for complete search history.

(56) References Cited

U.S. PATENT DOCUMENTS

| | | |
|---|---|---|
| 5,481,590 A | 1/1996 | Grimes |
| 5,790,974 A | 8/1998 | Tognazzini |
| 5,805,587 A * | 9/1998 | Norris et al. ............... 370/352 |
| 5,938,721 A | 8/1999 | Dussell et al. |
| 6,026,156 A | 2/2000 | Epler et al. |
| 6,222,482 B1 | 4/2001 | Gueziec |
| 6,356,533 B1 | 3/2002 | Bruno et al. |
| 6,411,687 B1 | 6/2002 | Bohacek et al. |
| 6,434,404 B1 | 8/2002 | Claxton et al. |
| 6,535,748 B1 | 3/2003 | Vuorio et al. |
| 6,542,584 B1 | 4/2003 | Sherwood et al. |
| 2002/0059434 A1 | 5/2002 | Karaoguz et al. |
| 2002/0086680 A1 | 7/2002 | Hunzinger |
| 2002/0089421 A1 | 7/2002 | Farringdon et al. |
| 2002/0146107 A1 * | 10/2002 | Baals et al. ............ 379/215.01 |
| 2003/0039339 A1 | 2/2003 | Luehrig et al. |
| 2003/0054865 A1 | 3/2003 | Byers et al. |

FOREIGN PATENT DOCUMENTS

| | | |
|---|---|---|
| EP | 1008946 | 6/2000 |
| GB | 2303271 | 12/1997 |
| JP | 09113599 | 2/1997 |
| WO | WO-97/50231 | 12/1997 |

* cited by examiner

*Primary Examiner*—Benny Quoc Tieu
(74) *Attorney, Agent, or Firm*—DeMont & Breyer LLC.

(57) ABSTRACT

A technique for notifying a person who is engaged in a telephone call with a second person that a third person is calling him or her is disclosed. In particular, the illustrative embodiments wait for an "appropriate opportunity" to notify person 101-1 of the arrival of the incoming message from person 101-3. For example, the appropriate opportunity is chosen so that it is, at least potentially, less disruptive to the conversation between person 101-1 and person 101-2 than would an arbitrarily-timed notification.

12 Claims, 8 Drawing Sheets

POLITE CALL WAITING NOTIFICATION

This application claims the benefit of U.S. Provisional Patent Application 60/380,140, filed on 6 May 2002, entitled "Method for Interception, Manipulations, and Usage of Bluetooth Voice Streams."

FIELD OF THE INVENTION

The present invention relates to telecommunications in general, and, more particularly, to a technique for notifying a person who is engaged in a telephone call with a second person that a third person is calling him or her.

BACKGROUND OF THE INVENTION

A popular feature of modern telecommunications systems is "call waiting." Without call waiting, a person who was engaged in a telephone call with a second person did not know when a third person was calling him or her. In contrast, with call waiting, a person who is engaged in a telephone call does, in fact, know when a third party is calling.

In accordance with a typical call waiting system, the telecommunications system notifies the first person that a third person is calling by injecting a series of beeps into his or her ear. This is accomplished by generating and injecting the beeps into the audio channel from the second person. Upon hearing the beeps, the first person can either ignore the incoming call or can put the current call on hold and switch to the incoming call.

Although call waiting is popular and convenient, the method of notification is disadvantageous in that it often drowns out the voice of the second person. This is intrusive and disruptive and somewhat eliminates the overall advantage of call waiting in the first place.

Therefore, the need exists for a less intrusive and disruptive technique for notifying a person who is engaged in a telephone call with a second person that a third person is calling him or her.

SUMMARY OF THE INVENTION

The present invention provides a technique for notifying a person who is engaged in a telephone call with a second person that a third person is calling him or her without some of the costs and disadvantages for doing so in the prior art. In particular, the illustrative embodiments wait for an "appropriate opportunity" to notify person 101-1 of the arrival of the incoming message from person 101-3. For example, the appropriate opportunity is chosen so that it is, at least potentially, less disruptive to the conversation between person 101-1 and person 101-2 than would an arbitrarily-timed notification.

The illustrative embodiment comprises: a receiver for receiving an incoming message for a first person, wherein the incoming message arrives while the first person is engaged in a telephone call with a second person; and a processor for waiting to notify the first person of the arrival of the incoming message until the first person is silent.

DETAILED DESCRIPTION

Figure 1:
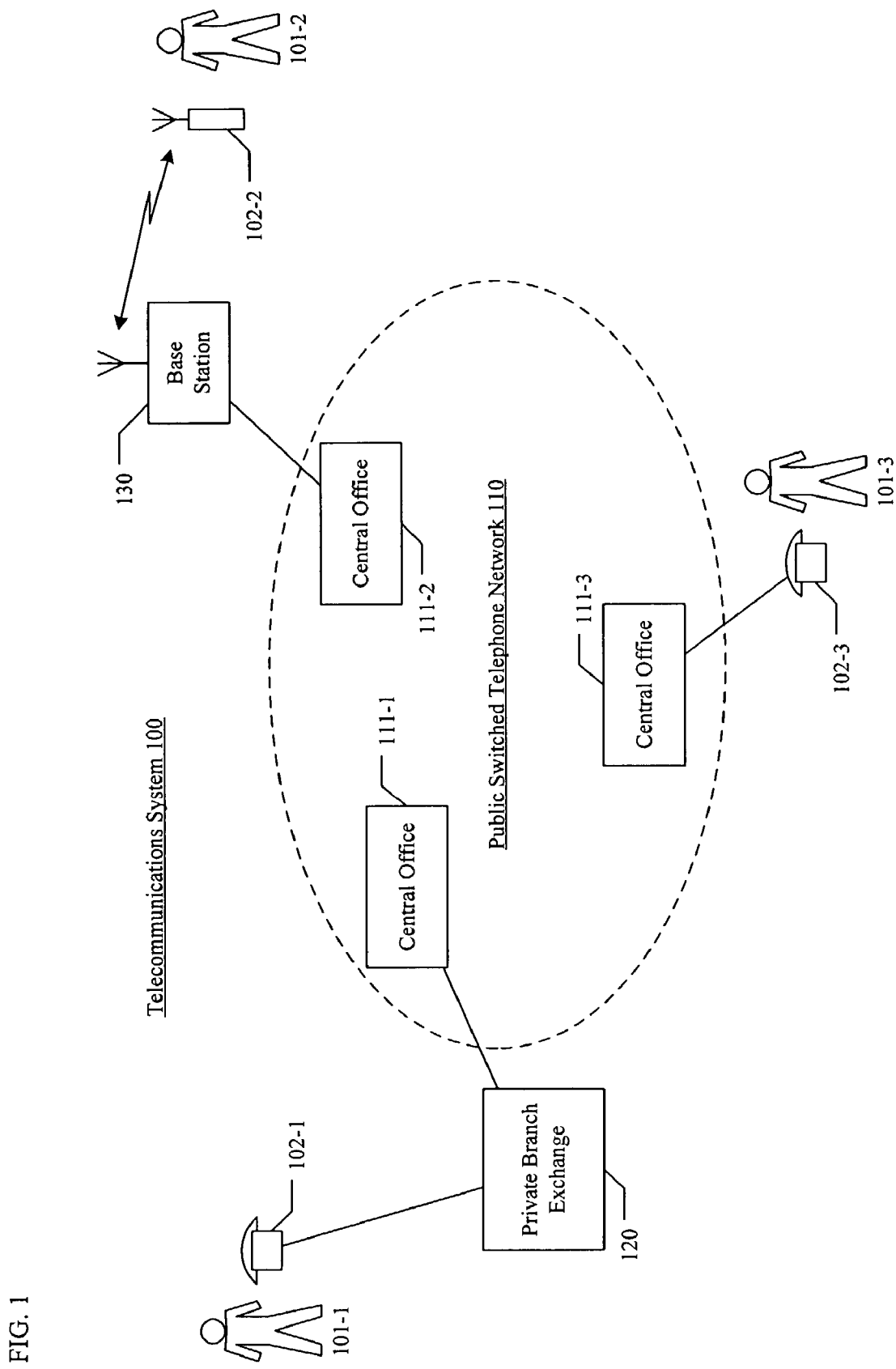
FIG. 1 depicts a schematic diagram of the salient components of a telecommunications system in accordance with the illustrative embodiments of the present invention.

FIG. 1 depicts a schematic diagram of the salient components of a telecommunications system in accordance with the illustrative embodiments of the present invention. Telecommunications system 100 comprises: people 101-1 through 101-3, telephones 102-1 through 102-3 associated with people 101-1 through 101-3, respectively, public switched telephone network 110, central offices 111-1 through 111-3, private branch exchange 120, and cellular base station 130, interconnected as shown.

In accordance with the illustrative embodiments, person 101-1 has access to public switched telephone network 110 via wireline telephone 102-1 and private branch exchange ("PBX") 120. It will be clear to those skilled in the art, however, after reading this specification, how to make and use alternative embodiments of the present invention in which person 101-1 has access to public switched telephone network 110 directly via a wireline telephone or via a wireless telephone (e.g., a cellular telephone, a two-way pager, a personal digital assistant, etc.).

In accordance with the illustrative embodiments, person 101-2 has access to public switched telephone network 110 via wireline telephone 102-2. It will be clear to those skilled in the art, however, after reading this specification, how to make and use alternative embodiments of the present invention in which person 101-2 has access to public switched telephone network 110 via a private branch exchange or via a wireless telephone.

In accordance with the illustrative embodiments, person 101-3 has access to public switched telephone network 110 via wireless telephone 102-3, which is connected to public switched telephone network 110 via cellular base station 130. It will be clear to those skilled in the art, however, after reading this specification, how to make and use alternative embodiments of the present invention in which person 101-3 has access to public switched telephone network 110 via a wireline telephone or via a private branch exchange.

In accordance with the illustrative embodiments, people 101-1, 101-2, and 101-3 engage in telephone calls via public switched telephone network 110. It will be clear to those skilled in the art, however, after reading this specification, how to make and use embodiments of the present invention in which some or all of people 101-1, 101-2, and 101-3 communicate via a different network (e.g., the Internet, an intranet, a private telecommunications network, a cellular or other wireless network, etc.). Furthermore, it will be clear to those skilled in the art, after reading this specification, how to make and use embodiments of the present invention in which person 101-3 sends a text message, data message, voice-mail message, or a video message to person 101-1 that does not require the immediate attention of person 101-1 (i.e., that does not require that person 101-1 and person 101-3 have a real-time interactive conversation). And still furthermore, it will be clear to those skilled in the art, after reading this specification, how to make and use embodiments of the present invention in which various telecommunications terminals other than telephones (e.g., personal digital assistants, two-way pagers, video terminals, etc.) are used by some or all of people 101-1, 101-2, and 101-3.

In accordance with the first illustrative embodiment, the present invention resides solely in telephone 101-1. In accordance with the second illustrative embodiment, the present invention resides solely in private branch exchange 120, and in accordance with the third illustrative embodiment, the present invention resides solely in public switched telephone network 110. It will be clear to those skilled in the art, however, after reading this specification, how to make and use embodiments of the present invention that reside elsewhere (e.g., in any combination of a telephone, a private branch exchange, and the public switched telephone network, etc.).

Figure 2:
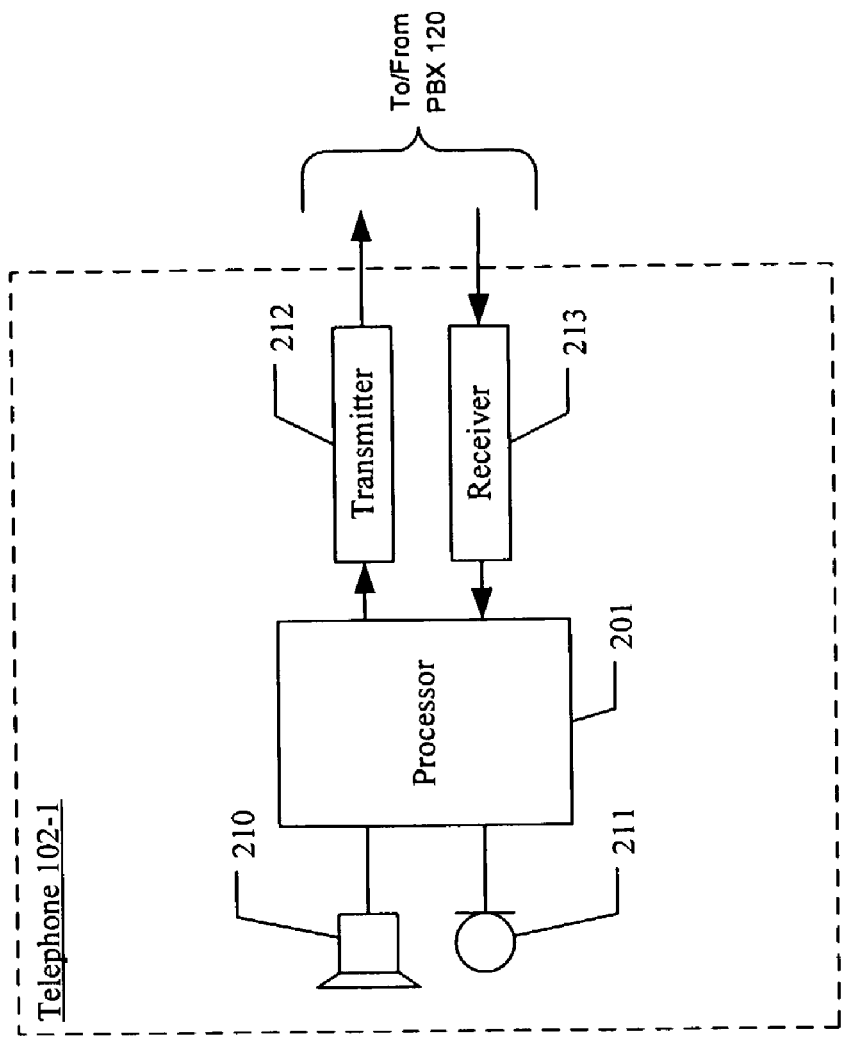
FIG. 2 depicts a block diagram of the first illustrative embodiment, in which the present invention resides solely in telephone 102-1.

FIG. 2 depicts a block diagram of the first illustrative embodiment, in which the present invention resides solely in telephone 102-1. Telephone 102-1 is hand-held telephone, but it will be clear to those skilled in the art how, after reading this specification, to make and use alternative embodiments of the present invention in which telephone 102-1 is a hands-free terminal or a data terminal or both.

Telephone 102-1 comprises: processor 201, speaker 210, microphone 211, transmitter 212, and receiver 213, interconnected as shown.

Processor 201 is a programmed general-purpose processor that is capable of performing all of the functionality described below and with respect to FIG. 3. It will be clear to those skilled in the art, however, after reading this specification, how to make and use alternative embodiments of the present invention in which processor 201 is a "hardwired" or special-purpose processor.

Speaker 210 is an electro-acoustic transducer that converts information-bearing electromagnetic signals representing sound into sound for person 101-1. It will be clear to those skilled in the art how to make and use speaker 210.

Microphone 211 is an electro-acoustic transducer that converts sound into information-bearing electromagnetic signals for processor 201. It will be clear to those skilled in the art how to make and use microphone 211.

Transmitter 212 comprises the circuitry that enables telephone 102-1 to transmit information-bearing electromagnetic signals to private branch exchange 120. It will be clear to those skilled in the art how to make and use transmitter 212.

Receiver 213 comprises the circuitry that enables telephone 102-1 to receive electromagnetic signals from private branch exchange 120. In particular, receiver 213 is capable of receiving a plurality of disparate information-bearing signals (e.g., telephone calls, text messages, video calls, etc.) simultaneously. It will be clear to those skilled in the art how to make and use receiver 213.

Figure 3:
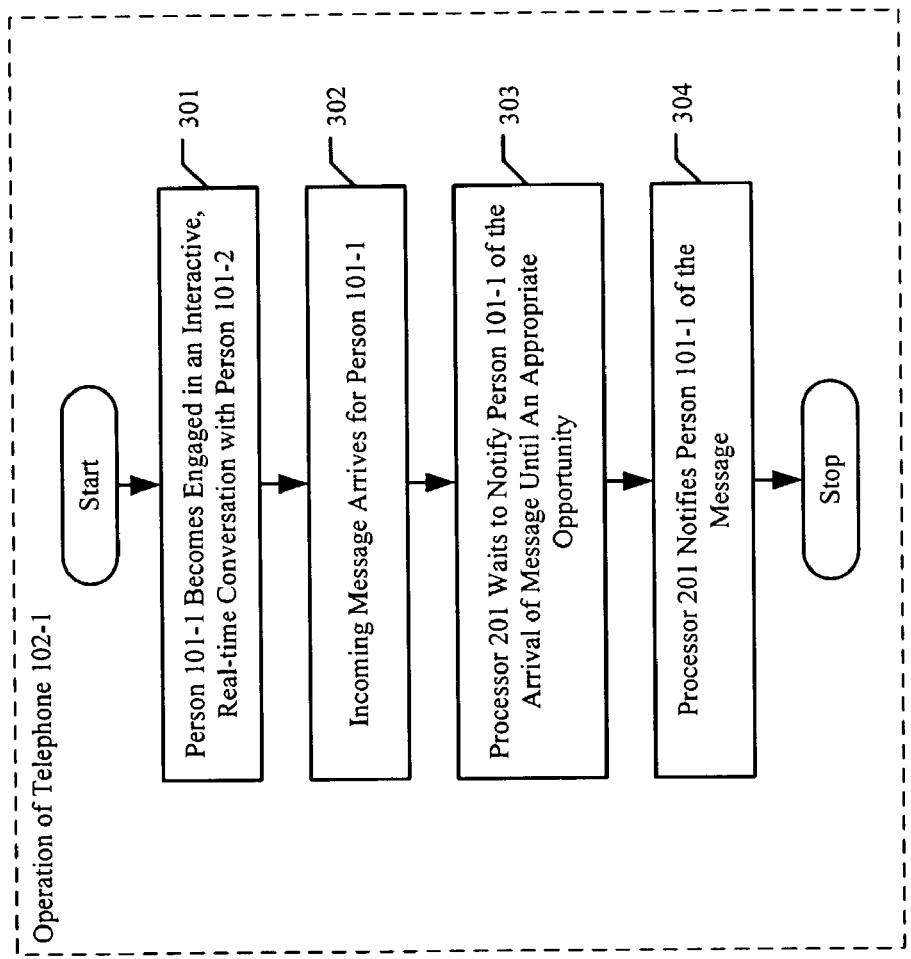
FIG. 3 depicts a flowchart of the operation of telephone 102-1 in accordance with the first illustrative embodiment.

FIG. 3 depicts a flowchart of the operation of telephone 102-1 in accordance with the first illustrative embodiment.

At event 301, person 101-1 becomes engaged in a real-time, interactive conversation (e.g., a telephone call, a video conference, an instant message session, etc.) with person 101-2, which conversation is connected through telephone 102-1, private branch exchange 120, public switched telephone network 110, and telephone 102-2.

Figure 4:
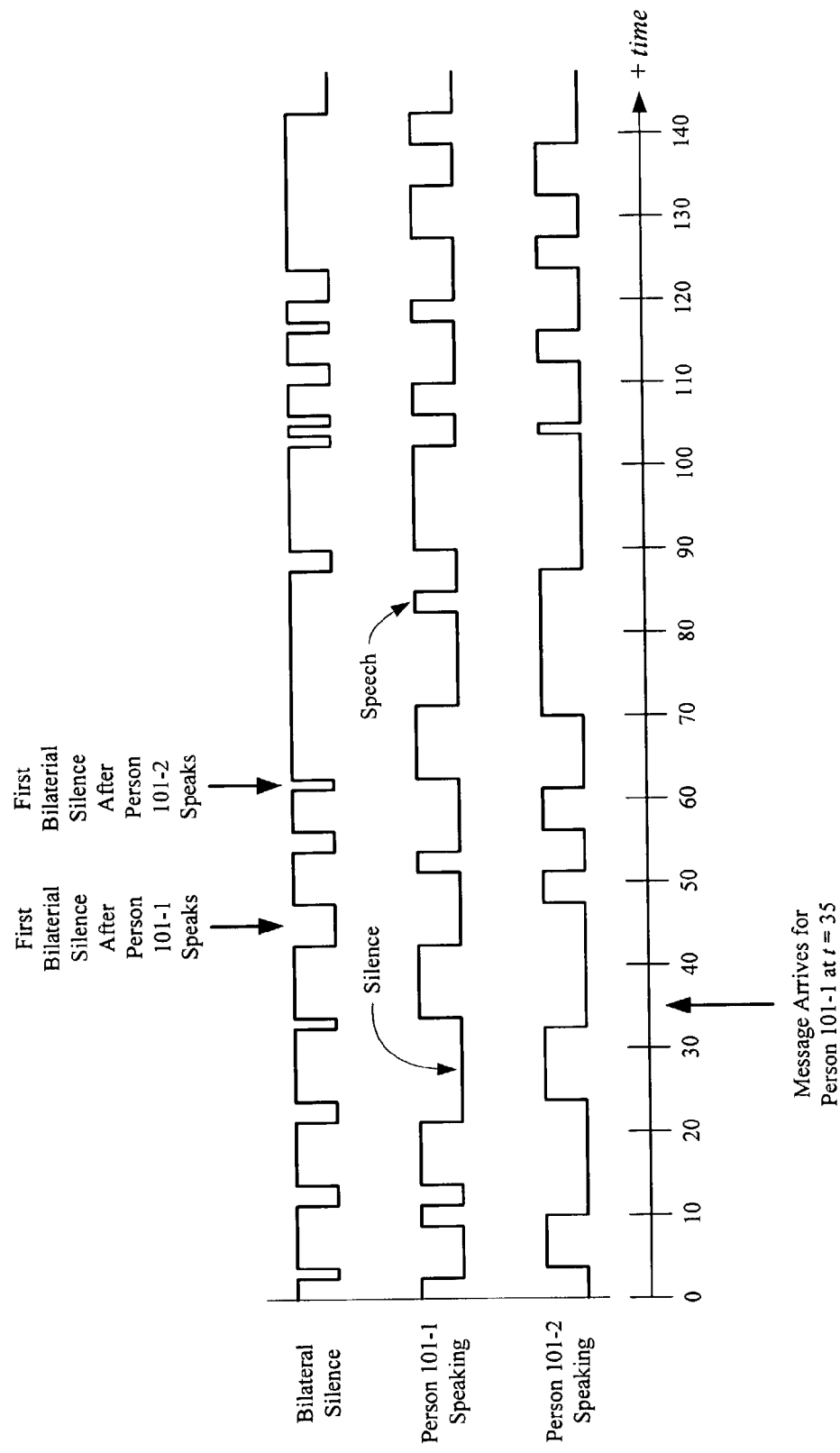
FIG. 4 depicts a graphic representation of an illustrative conversation between person 101-1 and person 101-2.

FIG. 4 depicts a graphic representation of an illustrative conversation between person 101-1 and person 101-2. FIG. 4 depicts three time-varying waveforms labeled: bilateral silence, person 101-1 speaking, and person 101-2. The person 101-1 speaking and the person 101-2 speaking waveforms indicate when person 101-1 and person 101-2 are speaking, relatively, and when they are each silent (e.g., listening, thinking, distracted, etc.) during the conversation, which began at t=0.

The bilateral silence waveform in FIG. 4 represents those times during the conversation between person 101-1 and person 101-2 when they are both simultaneously silent. The bilateral silence waveform is equivalent to the Boolean OR function of the person 101-1 speaking and the person 101-2 speaking waveforms.

At event 302, and while person 101-1 is engaged in a real-time, interactive conversation with person 101-2, an incoming message (e.g., a telephone call, an e-mail, a video conference call, an instant message, etc.) arrives at receiver 213 for person 101-1. In accordance with the first illustrative embodiment, the incoming message is from person 101-3. It will be clear to those skilled in the art, however, that in some alternative embodiments of the present invention the incoming message might originate not from a person, but rather from a computer.

At event 304, processor 201 prepares to notify person 101-1 of the arrival of the incoming message from person 101-3. Although processor 201 could reflexively notify person 101-1, processor 201 instead waits for an "appropriate opportunity" to notify person 101-1 of the arrival of the incoming message from person 101-3. In accordance with the illustrative embodiments of the present invention, the appropriate opportunity is chosen by processor 201 so that it is, at least potentially, less disruptive to the conversation between person 101-1 and person 101-2 than would an arbitrarily-timed notification.

In one variation of the present invention, processor 201 waits to notify person 101-1 of the arrival of the incoming message from person 101-3 until person 101-1 is silent. This reduces the likelihood that processor 101-1 will interrupt person 101-1 while person 101-1 is speaking.

In another variation, processor 201 performs an empirical analysis of the conversation between person 101-1 and person 101-2 to assist in ascertaining an appropriate opportunity to notify person 101-1 of the arrival of the incoming message from person 101-3. For example, if the notification takes n seconds, then processor 201 performs an empirical analysis of the duration of the occurrences of silence in the conversation to predict the circumstances when person 101-1 will be silent for the duration of the notification. In this case, the empirical analysis might reveal that when person 101-1 is silent for t seconds, then it is likely that person 101-1 will be silent for another n seconds. Therefore, processor 201 waits to notify person 101-1 of the arrival of the incoming message from person 101-3 until person 101-1 has been silent for t seconds. In this specification, both t and n are positive real numbers.

In another variation of the present invention, processor 201 waits to notify person 101-1 of the arrival of the incoming message from person 101-3 until person 101-2 is silent. This reduces the likelihood that processor 101-1 will interrupt person 101-1 while he or she is listening to person 101-2.

In yet another variation, processor 201 performs an empirical analysis of the conversation between person 101-1 and person 101-2 to assist in ascertaining an appropriate opportunity to notify person 101-1 of the arrival of the incoming message from person 101-3. For example, if the notification takes n seconds, then processor 201 performs an empirical analysis of the duration of the occurrences of silence in the conversation to predict the circumstances when person 101-2 will be silent for the duration of the notification. In this case, the empirical analysis might reveal that when person 101-2 is silent for t seconds, then it is likely that person 101-2 will be silent for another n seconds. Therefore, processor 201 waits to notify person 101-1 of the arrival of the incoming message from person 101-3 until person 101-2 has been silent for t seconds.

In still another variation, processor 201 waits to notify person 101-1 of the arrival of the incoming message from person 101-3 until both person 101-1 and person 101-2 are silent. In FIG. 4, this is called "bilateral silence." This is advantageous because it attempts to notify person 101-1 of the incoming message at a time when person 101-1 is neither speaking or listening.

In another variation, processor 201 performs an empirical analysis of the conversation between person 101-1 and person 101-2 to assist in ascertaining an appropriate opportunity to notify person 101-1 of the arrival of the incoming message from person 101-3. For example, if the notification takes n seconds, then processor 201 performs an empirical analysis of the duration of the occurrences of bilateral silence in the conversation to predict the circumstances when a bilateral silence will occur that is longer than the duration of the notification. In this case, the empirical analysis might reveal that when a bilateral silence has existed for t seconds, then it is likely that the bilateral silence will continue for another n seconds. Therefore, processor 201 waits to notify person 101-1 of the arrival of the incoming message from person 101-3 until both person 101-1 and person 101-2 have been silent for t seconds.

In one variation of this embodiment, processor 201 waits to notify person 101-1 of the arrival of the incoming message from person 101-3 until both person 101-1 and person 101-2 have been silent for t seconds and person 101-1 spoke last. This is advantageous because it attempts to notify person 101-1 of the incoming message at a time when person 101-1 is waiting for person 101-2 to speak. Alternatively, processor 201 waits to notify person 101-1 of the arrival of the incoming message from person 101-3 until both person 101-1 and person 101-2 have been silent for t seconds and person 101-2 spoke last.

In any case, processor 201 can be programmed by person 101-1 so that person 101-1 can dictate the parameters governing when he or she desires to be interrupted.

At event 304, processor 201 provides person 101-1 with the notification generated at event 304 by injecting it the audio channel from person 101-2, which is then output via speaker 210.

It will be clear to those skilled in the art, after reading this specification, how to make and use telephones in accordance with the present invention.

Figure 5:
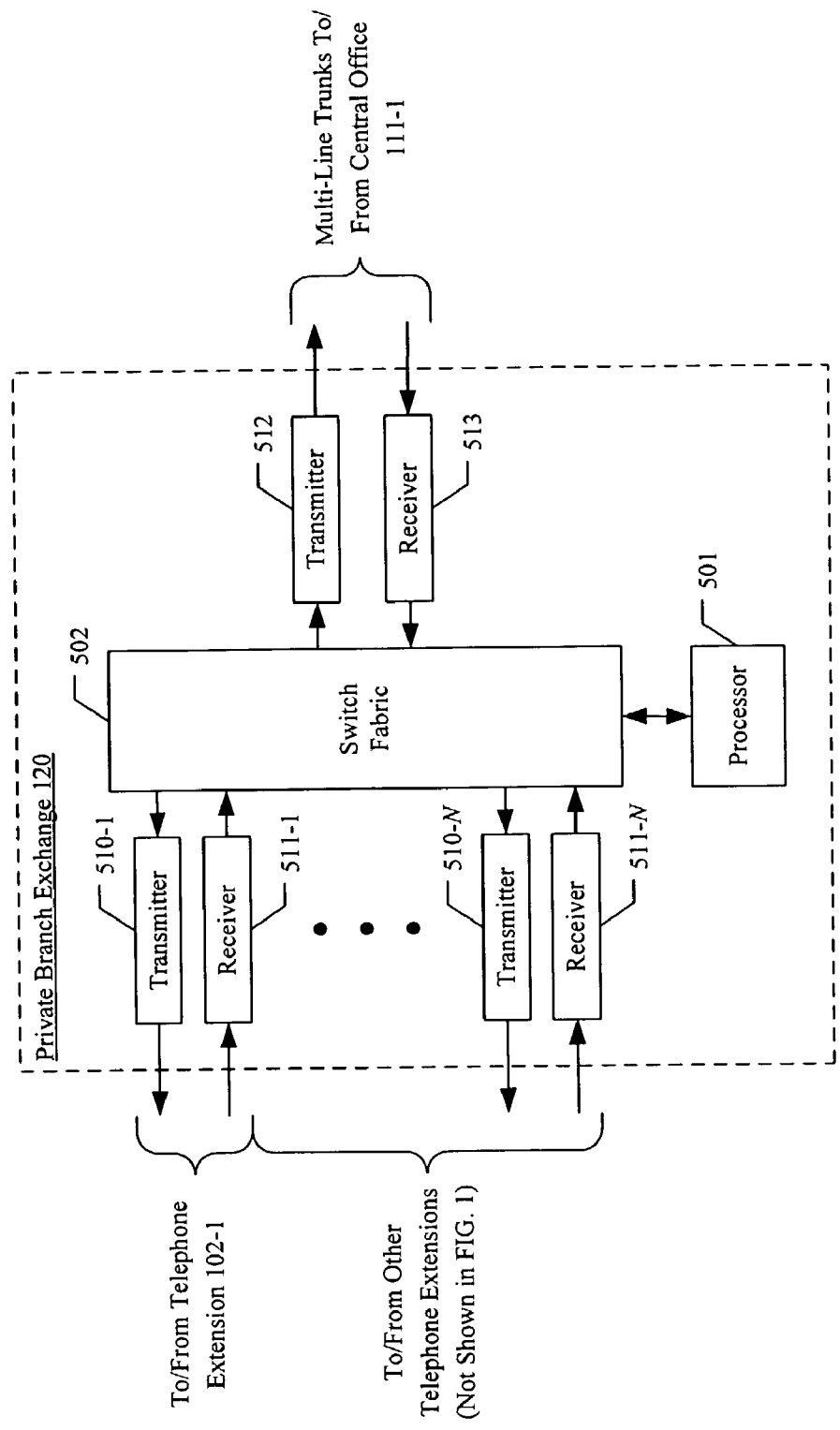
FIG. 5 depicts a block diagram of the second illustrative embodiment, in which the present invention resides solely in private branch exchange 120.

FIG. 5 depicts a block diagram of the second illustrative embodiment, in which the present invention resides solely in private branch exchange 120. Private branch exchange 120 comprises: switch fabric 502, processor 501, transmitter 512, receiver 513, and N pairs of transmitters and receivers—transmitters 510-1 through 510-N and receivers 511-1 through 511-N—interconnected as shown, wherein N is a positive integer.

Switch fabric 502 enables private branch exchange 120 to establish a telephone call between one or more extension telephones (e.g., telephone 102-1, etc.) and public switched telephone network 110. It will be clear to those skilled in the art how to make and use switch fabric 502.

Processor 501 is a programmed general-purpose processor that is capable of performing all of the functionality described below and with respect to FIG. 5. It will be clear to those skilled in the art, however, after reading this specification, how to make and use alternative embodiments of the present invention in which processor 501 is a "hard-wired" or special-purpose processor.

Transmitter 512 comprises the circuitry that enables private branch exchange 120 to transmit information-bearing electromagnetic signals to public switched telephone network 110. It will be clear to those skilled in the art how to make and use transmitter 512.

Receiver 513 comprises the circuitry that enables private branch exchange 120 to receiving information-bearing electromagnetic signals from public switched telephone network 110. It will be clear to those skilled in the art how to make and use receiver 513.

Transmitter 510-i, for i=1 to N, comprises the circuitry that enables private branch exchange 120 to transmit information-bearing electromagnetic signals to telephone extension 102-i. It will be clear to those skilled in the art how to make and use transmitter 510-i.

Receiver 511-i comprises the circuitry that enables private branch exchange to receive information-bearing electromagnetic signals from telephone extension 102-i. It will be clear to those skilled in the art how to make and use receiver 511-i.

Figure 6:
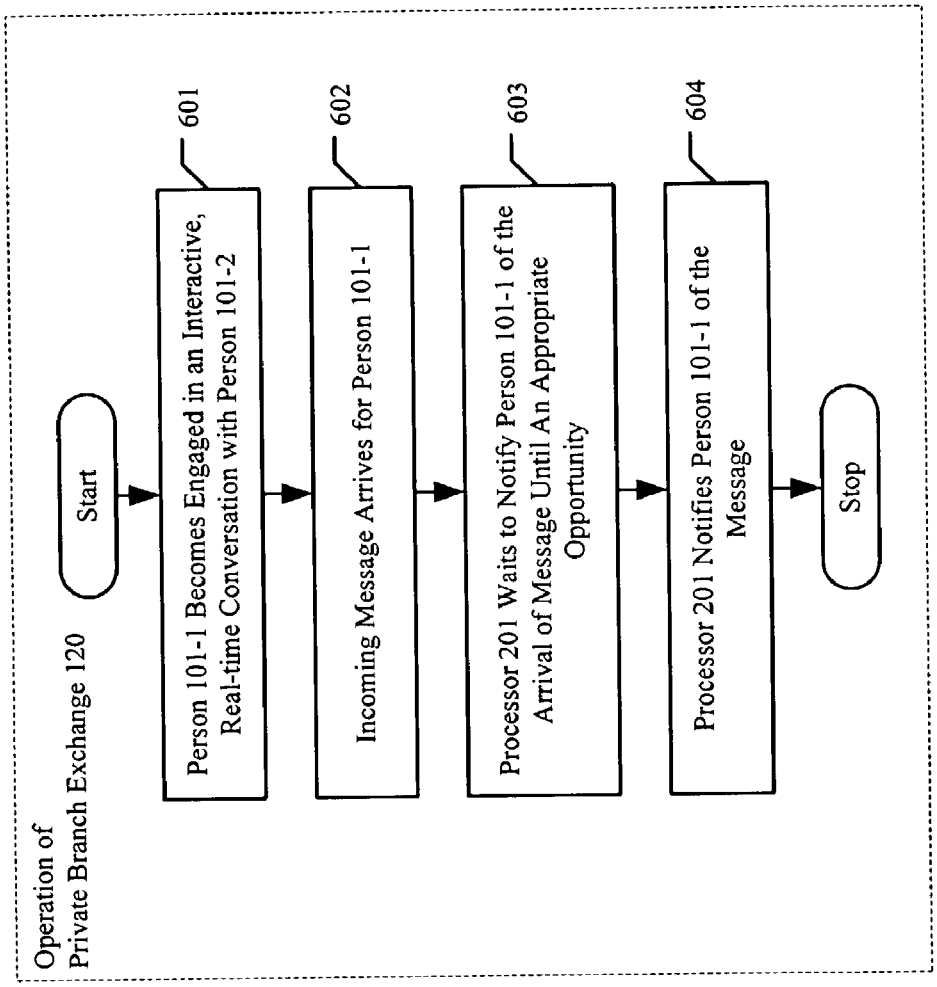
FIG. 6 depicts a flowchart of the operation of private branch exchange 120 in accordance with the second illustrative embodiment.

FIG. 6 depicts a flowchart of the operation of telephone 102-1 in accordance with the second illustrative embodiment.

At event 601, person 101-1 becomes engaged in a real-time, interactive conversation (e.g., a telephone call, a video conference, an instant message session, etc.) with person 101-2, which conversation is connected through telephone 102-1, private branch exchange 120, public switched telephone network 110, and telephone 102-2.

At event 602, and while person 101-1 is engaged in a real-time, interactive conversation with person 101-2, an incoming message (e.g., a telephone call, an e-mail, a video conference call, an instant message, etc.) arrives at receiver 213 for person 101-1.

At event 603, processor 501 prepares to notify person 101-1 of the arrival of the incoming message from person 101-3. Although processor 501 could reflexively notify person 101-1, processor 501 instead waits for an "appropriate opportunity" to notify person 101-1 of the arrival of the incoming message from person 101-3 in any one or more of the ways that processor 201 uses in performing event 303.

At event 604, processor 501 provides person 101-1 with the notification generated at event 304 by injecting it the audio channel from person 101-2, which is then output via speaker 210. It will be clear to those skilled in the art, after reading this specification, how to make and use private branch exchanges in accordance with the present invention.

Figure 7:
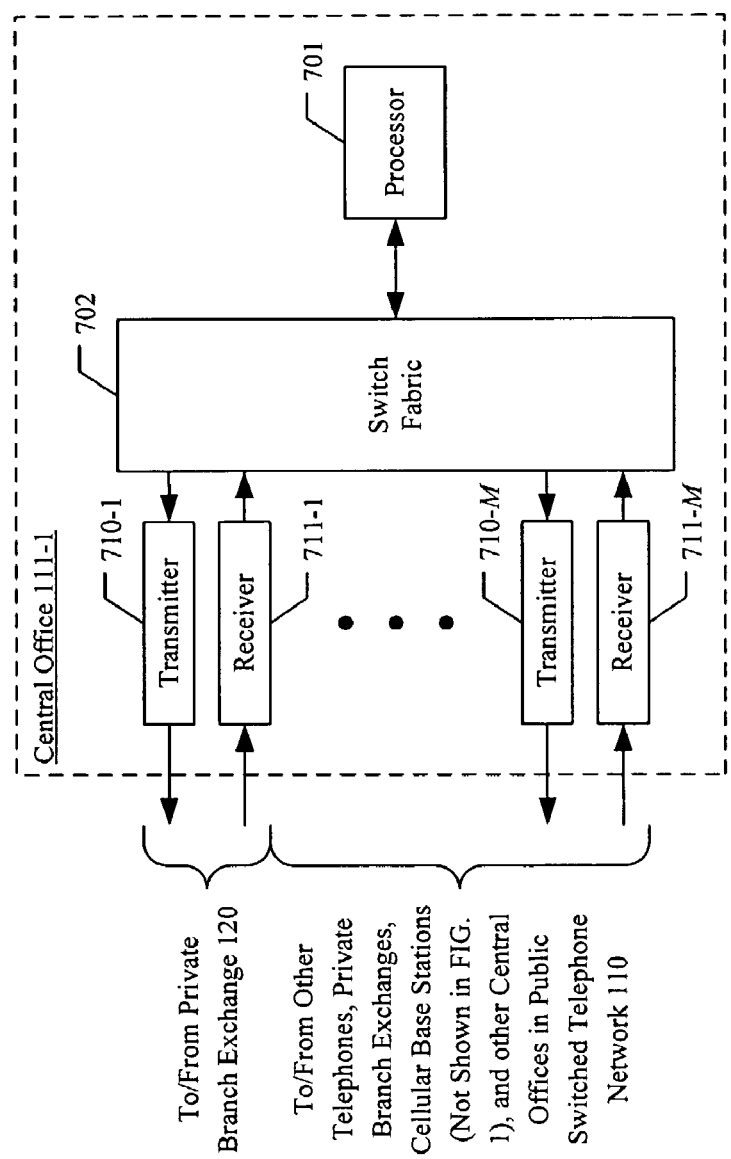
FIG. 7 depicts a block diagram of the third illustrative embodiment, in which the present invention resides solely in central office 111-1.
Figure 8:
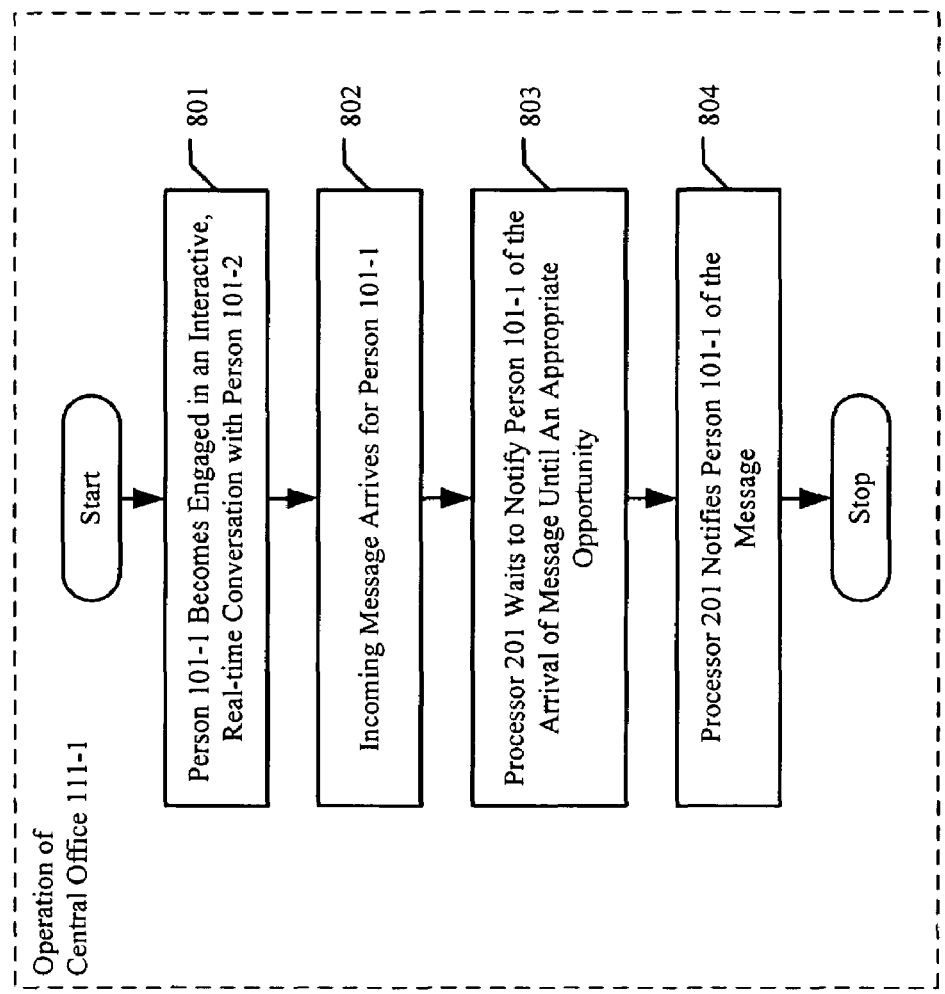
FIG. 8 depicts a flowchart of the operation of central office 111-1 in accordance with the third illustrative embodiment.

FIG. 7 depicts a block diagram of the third illustrative embodiment, in which the present invention resides solely in central office 111-1. Central office 111-1 comprises: switch fabric 702, processor 701, M pairs of transmitters and receivers—transmitters 710-1 through 710-M and receivers 411-1 through 411-M—interconnected as shown, wherein M is a positive integer.

Switch fabric 702 enables central office 111-1 to establish a telephone call between one or more telephones, private branch exchanges, cellular base stations, and other central offices in public switched telephone network 110. It will be clear to those skilled in the art how to make and use switch fabric 402.

Processor 701 is a programmed general-purpose processor that is capable of performing all of the functionality described below and with respect to FIG. 7. It will be clear to those skilled in the art, however, after reading this specification, how to make and use alternative embodiments of the present invention in which processor 701 is a "hardwired" or special-purpose processor.

Transmitter 710-1 comprises the circuitry that enables central office 111-1 to transmit information-bearing electromagnetic signals to private branch exchange 120. It will be clear to those skilled in the art how to make and person transmitter 710-1.

Receiver 711-1 comprises the circuitry that enables central office 111-1 to receive information-bearing electromagnetic signals from private branch exchange 120. It will be clear to those skilled in the art how to make and use receiver 711-1.

Transmitter 710-j, for j=2 to N, comprises the circuitry that enables central office 111-1 to transmit information-bearing electromagnetic signals to telephones, private branch exchanges, cellular base stations, and other central offices in public switched telephone network 110. It will be clear to those skilled in the art how to make and use transmitter 710-j.

Receiver 711-j comprises the circuitry that enables central office 111-1 to receive information-bearing electromagnetic signals from telephones, private branch exchanges, cellular base stations, and other central offices in public switched telephone network 110. It will be clear to those skilled in the art how to make and use receiver 711-j.

FIG. 7 depicts a flowchart of the operation of central office 111-1 in accordance with the third illustrative embodiment.

At event 701, person 101-1 becomes engaged in a real-time, interactive conversation (e.g., a telephone call, a video conference, an instant message session, etc.) with person 101-2, which conversation is connected through telephone 102-1, private branch exchange 120, public switched telephone network 110, and telephone 102-2.

At event 702, and while person 101-1 is engaged in a real-time, interactive conversation with person 101-2, an incoming message (e.g., a telephone call, an e-mail, a video conference call, an instant message, etc.) arrives at receiver 213 for person 101-1.

At event 703, processor 701 prepares to notify person 101-1 of the arrival of the incoming message from person 101-3. Although processor 701 could reflexively notify person 101-1, processor 701 instead waits for an "appropriate opportunity" to notify person 101-1 of the arrival of the incoming message from person 101-3 in any one or more of the ways that processor 201 uses in performing event 303.

At event 704, processor 701 provides person 101-1 with the notification generated at event 304 by injecting it the audio channel from person 101-2, which is then output via speaker 210.

It will be clear to those skilled in the art, after reading this specification, how to make and use private branch exchanges in accordance with the present invention. It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
   a receiver for receiving an incoming message for a first person, wherein said incoming message arrives while said first person is engaged in a telephone call with a second person; and
   a processor for waiting to notify said first person of the arrival of said incoming message until said first person is silent.

2. The apparatus of claim 1 wherein said processor waits to notify said first person of the arrival of said incoming message until said first person has been silent continuously for t seconds, wherein t is a positive real number.

3. The apparatus of claim 2 wherein the value of t is based, at least in part, on an empirical analysis of the duration of the occurrences of said first person's silence during said telephone call.

4. An apparatus comprising:
   a receiver for receiving an incoming message for a first person, wherein said incoming message arrives while said first person is engaged in a telephone call with a second person; and
   a processor for waiting to notify said first person of the arrival of said incoming message until said second person is silent.

5. The apparatus of claim 4 wherein said processor waits to notify said first person of the arrival of said incoming message until said second person has been silent continuously for t seconds, wherein t is a positive real number.

6. The apparatus of claim 5 wherein the value of t is based, at least in part, on an empirical analysis of the duration of the occurrences of said second person's silence during said telephone call.

7. An apparatus comprising:
   a receiver for receiving an incoming message for a first person, wherein said incoming message arrives while said first person is engaged in a telephone call with a second person; and
   a processor for waiting to notify said first person of the arrival of said incoming message until both said first person and said second person are both silent.

8. The apparatus of claim 7 wherein said processor waits to notify said first person of the arrival of said incoming message until said first person and said second person both have been silent continuously for t seconds, wherein t is a positive real number.

9. The apparatus of claim 7 wherein said processor waits to notify said first person of the arrival of said incoming message until both said first person and said second person have been silent for t seconds and said first person spoke last.

10. The apparatus of claim 7 wherein said processor waits to notify said first person of the arrival of said incoming message until both said first person and said second person have been silent for t seconds and said first person spoke last.

11. The apparatus of claim 7 wherein said processor waits to notify said first person of the arrival of said incoming message until both said first person and said second person have been silent for t seconds and said second person spoke last.

12. The apparatus of claim 7 wherein the value of t is based, at least in part, on an empirical analysis of the duration of the occurrences of silence during said telephone call.

* * * * *